US012754899B1

(12) United States Patent
Earnest et al.

(10) Patent No.: US 12,754,899 B1
(45) Date of Patent: Oct. 6, 2026

(54) AUTOMATIC CELL TABLE BUILDER

(71) Applicant: WORKIVA INC., Ames, IA (US)

(72) Inventors: Cody Earnest, Bozeman, MT (US); Daniel Way, Ankeny, IA (US); Kerby Seeley, Norwalk, IA (US); Jake Jackson, Boone, IA (US); Sarah Palumbo, Desbarats (CA)

(73) Assignee: WORKIVA INC., Ames, IA (US)

( * ) Notice: Subject to any disclaimer, the term of this patent is extended or adjusted under 35 U.S.C. 154(b) by 0 days.

(21) Appl. No.: 19/397,114

(22) Filed: Nov. 21, 2025

(51) Int. Cl.
*G06F 16/00* (2019.01)
*G06F 16/22* (2019.01)
*G06F 16/23* (2019.01)
*G06F 16/26* (2019.01)

(52) U.S. Cl.
CPC ........ *G06F 16/2358* (2019.01); *G06F 16/221* (2019.01); *G06F 16/26* (2019.01)

(58) Field of Classification Search
CPC ...... G06F 16/2246; G06F 40/14; G06F 40/18; G06F 16/285; G06F 40/30; G06F 16/283; G06F 16/221; G06F 16/2465; G06F 16/282; G06F 16/288; G06F 16/2282; G06F 16/2358; G06F 16/26; G06F 16/23; G06T 11/206; G06N 5/04; G06N 5/022
See application file for complete search history.

(56) References Cited

U.S. PATENT DOCUMENTS

| | | | | |
|---|---|---|---|---|
| 11,593,408 | B2 * | 2/2023 | Komninos | G06F 16/283 |
| 11,720,596 | B2 * | 8/2023 | Nelmes | G06F 16/221 707/601 |
| 2018/0203838 | A1 * | 7/2018 | Hiatt | G06F 16/2246 |

* cited by examiner

*Primary Examiner* — Yicun Wu
(74) *Attorney, Agent, or Firm* — Faegre Drinker Biddle & Reath LLP

(57) ABSTRACT

Systems and methods for generating a structured data table include one or more computing devices that carry out the following: receiving (a) source data comprising a plurality of data cells organized according to a schema and (b) user inputs including one or more transformations to be applied to the schema of the source data via a graphical user interface; generating mapping associated with the schema of the source data, the mapping defining the one or more transformations to be applied to the schema of the source data according to the user inputs; generating an automated cell table linked to the source data by applying the one or more transformations to the schema of the source data based on the mapping, the automated cell table comprising a plurality of concepts; and displaying the automated cell table.

22 Claims, 16 Drawing Sheets

AUTOMATIC CELL TABLE BUILDER

TECHNICAL FIELD

The present disclosure relates generally to electronic document management and, more particularly, to a system and method for generating and managing cell tables in electronic documents.

BACKGROUND

In systems configured to maintain electronic documents, users may establish links between a data source and multiple destinations for data synchronization (e.g., table cell). Typically, linked cells are automatically synchronized such that any change reflected in the source is automatically reflected in the destination via real-time synchronization. However, when the structure of the table needs to be changed or customized according to user's preference, the change in structure is difficult to reflect without losing the established links between the data source and the destinations. In some cases, the user may need to generate the table from scratch to reflect the preferred table structure or to reflect the changes manually by individually changing the cells within the tables, which is inefficient and prone to human errors.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

In systems configured to maintain electronic documents, users may establish and manage links between different cells, such as for data synchronization (e.g., table cell). For example, a user may create a report (e.g., a text document, a table, or a spreadsheet) using information retrieved from the source document, or source data. The source data may be provided as a spreadsheet with a column header having a plurality of field names, and a plurality of records inputted in tabulated form (e.g., cells) for quick and easy data retrieval from the spreadsheet to be used in generating an automated cell table in a separate document, such as a separate spreadsheet or text document.

In accordance with at least one example of the present disclosure, systems and methods are provided for generating automated cell tables using originating data or source data that are linked via cell links while the users are granted the flexibility to customize the automated cell tables without having to manually and individually change each cell within the tables. Cell links between source and destination cells (e.g., point-to-point linking) may be created to allow flow through of data values, formats, and metadata (e.g., comments, attachments, XBRL), such that each cell may have an individual cell link.

Figure 1:
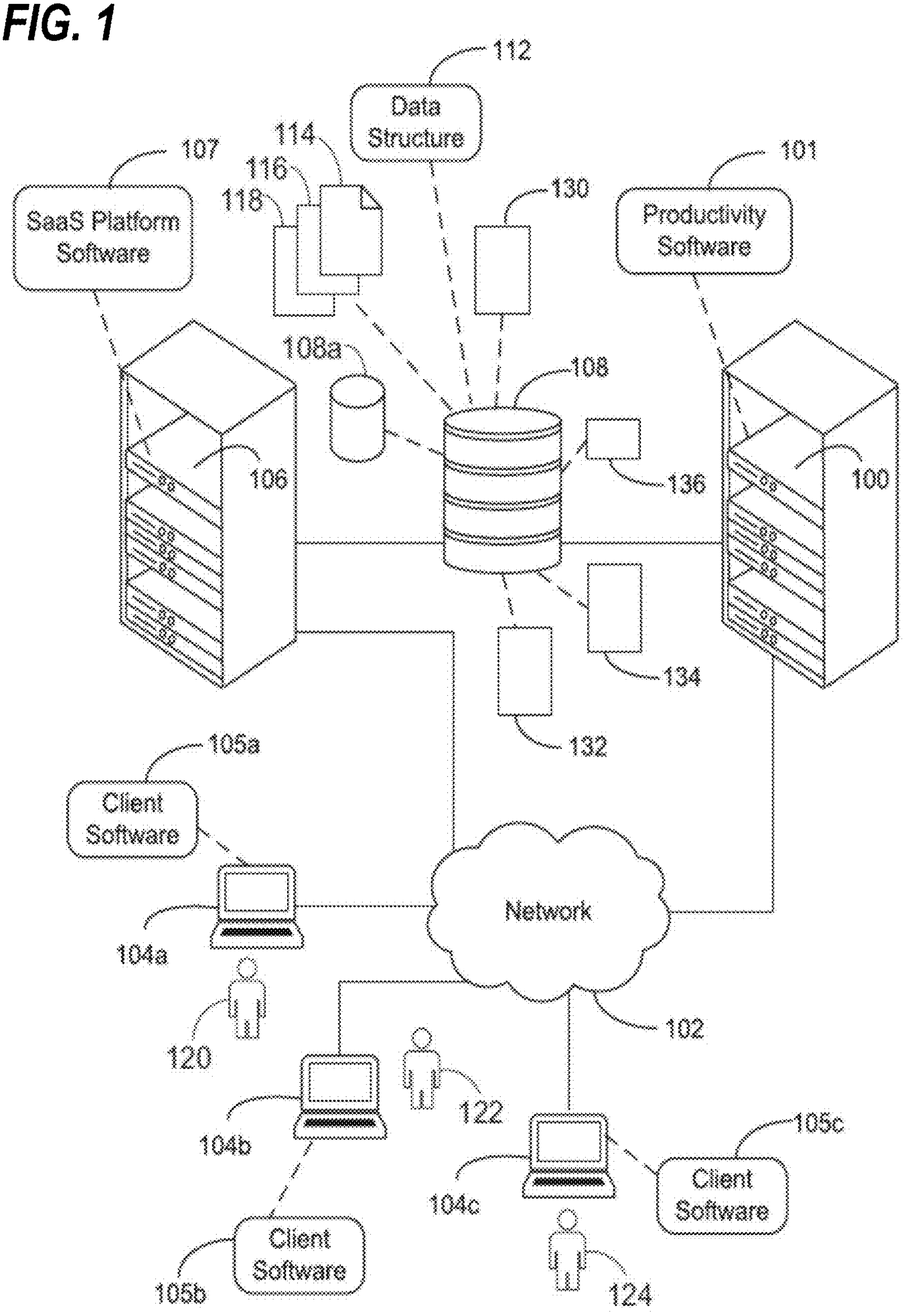
FIG. 1 is an example of a networking environment in which various embodiments of the disclosure may be implemented, according to an embodiment.

Turning to FIG. 1, an example of a computer networking environment in which various embodiments of the disclosure may be implemented is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104*a*, a third computing device 104*b*, a fourth computing device 104*c*, and a fifth computing device 106. The fifth computing device 106 is communicatively linked to a media storage device 108 (e.g., a redundant array of independent disks). For the sake of example, it is assumed that a first user 120 operates the second computing device 104*a*, a second user 122 operates the third computing device 104*b*, and a third user 124 operates the fourth computing device 104*c*. Each of the computing devices 104*a*, 104*b*, and 104*c* executes client software (reference numerals 105*a*, 105*b*, and 105*c*, respectively). One possible implementation of the client software is a web browser.

Residing within the media storage device 108 is a database 108*a* containing multiple documents, three of which are depicted in FIG. 1: a first document 114, a second document 116, and a third document 118. The first computing device 100 and the fifth computing device 106 are depicted as rack-mounted servers, while the second, third, and fourth computing devices 104*a*, 104*b*, and 104*c* are depicted as notebook computers. However, the computing devices depicted in FIG. 1 are merely representative. Other possible implementations of a computing device include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

In various embodiments, at least some documents are stored using a suitable data structure configured to maintain links and references between cells, tables, paragraphs, sections, or other suitable portions of a document. In an embodiment, documents are stored using an RTree data structure. In another embodiment, documents are stored using a causal tree data structure.

In an embodiment, the system includes a computing device that configures the computer memory according to a causal tree (a type of logic tree) representing a structure of a document. The computer memory may be internal to or external to the computing device. Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node and a collection of observation instances, from which all other instruction nodes branch. Except for the root node and observations, each editing instruction in the document is caused by whichever editing instruction that came before it. Every editing instruction is aware of the ID of its parent instruction, i.e., the instruction that "caused" it. In an embodiment, each instruction (other than the root node and observations) in the document may be represented as a 3-tuple: ID (ID of the instruction), CauseID (ID of the parent instruction), and Value (value of the instruction). Observations have a 3-tuple: ID (ID of the instruction), Start ID (ID of the first character in a range), and Stop ID (ID of character immediately after the last character in a range unless the same as the Start ID which indicates only a single character is to be observed). Additional instructions may be added to an observation to provide additional information or to modify the range being observed. Examples of observations are discussed in U.S. patent application Ser. No. 16/871,512.

In an embodiment, the system includes a computing device that configures the computer memory according to an RTree (a type of logic tree) representing a structure of a spreadsheet or other document. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR.

For convenient reference, the first computing device 100 will also be referred to as a "productivity server 100" and the fifth computing device 106 will also be referred to as a "database server 106." Although depicted in FIG. 1 as separate devices, in some embodiments, the functionality of the productivity server 100 and the database server 106 are on the same device. The productivity server 100 executes productivity software 101 to provide document collaboration services. The database server 106 executes Software-as-a-Service ("SaaS") platform software 107 to provide database services to the productivity software 101, such as maintaining the contents of the database 108*a* and providing a programming platform for various processes launched by the productivity software (e.g., to manipulate, store, and retrieve documents and other information from the database 108*a*). Under the control of the productivity software 101, the productivity server 100 interacts with the database server 106 (which operates under the control of the SaaS platform software 107) and the computing devices 104*a*, 104*b*, and 104*c* (also referred to as "client devices") to allow the computing devices to access the first document 114, the second document 116, and the third document 118 so that the first user 120, the second user 122, and the third user 124 can share contents of the documents (e.g., copy and paste a table between documents).

In an embodiment, documents maintained on the media storage device 108 may be organized into sections, with each section (e.g., the contents of the section) being maintained in its own separate data structure referred to as a "section entity." For example, the first document 114 in FIG. 1 has a first section represented by a first section entity 130, a second section represented by a second section entity 132, and a third section represented by a third section entity 134. The productivity software 101 uses an outline entity 136 (also stored on the media storage device) to determine how the sections are organized.

Figure 2:
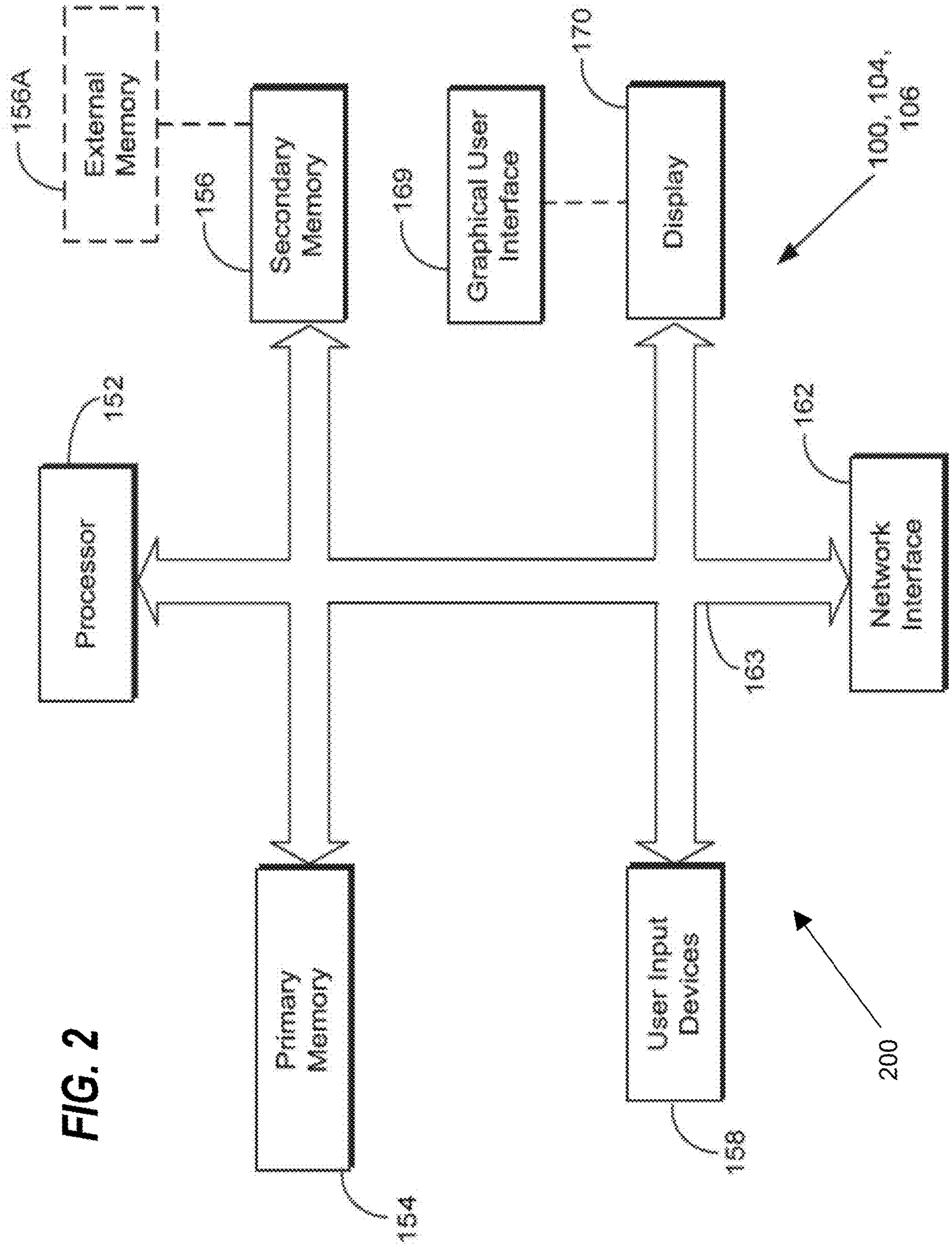
FIG. 2 is a block diagram of a computing device, according to an embodiment.

FIG. 2 is a block diagram of a computing device 200, according to an embodiment. One or more of the computing devices of FIG. 1 (including the media storage device 108) have the general architecture shown in FIG. 2, in various embodiments. The device depicted in FIG. 2 includes a processor 152 (e.g., a microprocessor, controller, or application-specific integrated circuit), a primary memory 154 (e.g., volatile memory, random-access memory), a secondary memory 156 (e.g., non-volatile memory, solid state drive, hard disk drive), user input devices 158 (e.g., a keyboard, mouse, or touchscreen), a display 160 (e.g., an organic, light-emitting diode display), and a network interface 162 (which may be wired or wireless). The memories 154 and 156 store instructions and data. The processor 152 executes the instructions and uses the data to carry out various procedures including, in some embodiments, the methods described herein.

Each of the elements of FIG. 2 is communicatively linked to one or more other elements via one or more data pathways 163. Possible implementations of the data pathways 163 include wires, conductive pathways on a microchip, and wireless connections. In an embodiment, the processor 152 is one of multiple processors in the computing device, each of which is capable of executing one or more separate threads. In an embodiment, the processor 152 communicates with other processors external to the computing device in order to initiate the execution of different threads on those other processors.

The term "local memory" as used herein refers to one or both of the memories 154 and 156 (i.e., memory accessible by the processor 152 within the computing device). In some embodiments, the secondary memory 156 is implemented as, or supplemented by an external memory 156A. The media storage device 108 is a possible implementation of the external memory 156A. The processor 152 executes the instructions and uses the data to carry out various procedures including, in some embodiments, the methods described herein, including displaying a graphical user interface 169. The graphical user interface 169 is, according to one embodiment, software that the processor 152 executes to display a report (e.g., a table or a spreadsheet) on the display device 160, and which permits a user to make inputs into the report via the user input devices 168.

The computing devices of FIG. 1 (i.e., the processor 152 of each of the computing devices) are able to communicate with other devices of FIG. 1 via the network interface 162 over the network 102. In an embodiment, this communication takes place via a user interface that the productivity server 150 provides to the computing devices 154*a*, 154*b*, and 154*c*. The specific nature of the user interface and what the user interface shows at any given time may vary depending on what the user has chosen to view. Also, multiple users may interact with different instances of the user interface on different devices. In some embodiments, the productivity server 150 carries out calculations to determine how content is to be rendered on a computing device, generates rendering instructions based on those calculations, and transmits those rendering instructions to the computing device. Using the received instructions, the computing device renders the content on a display. In other embodiments, the productivity server 150 transmits instructions regarding an asset to a computing device. In carrying out the received instructions, the computing device performs the appropriate calculations locally to render the content of the asset on a display.

Figure 3:
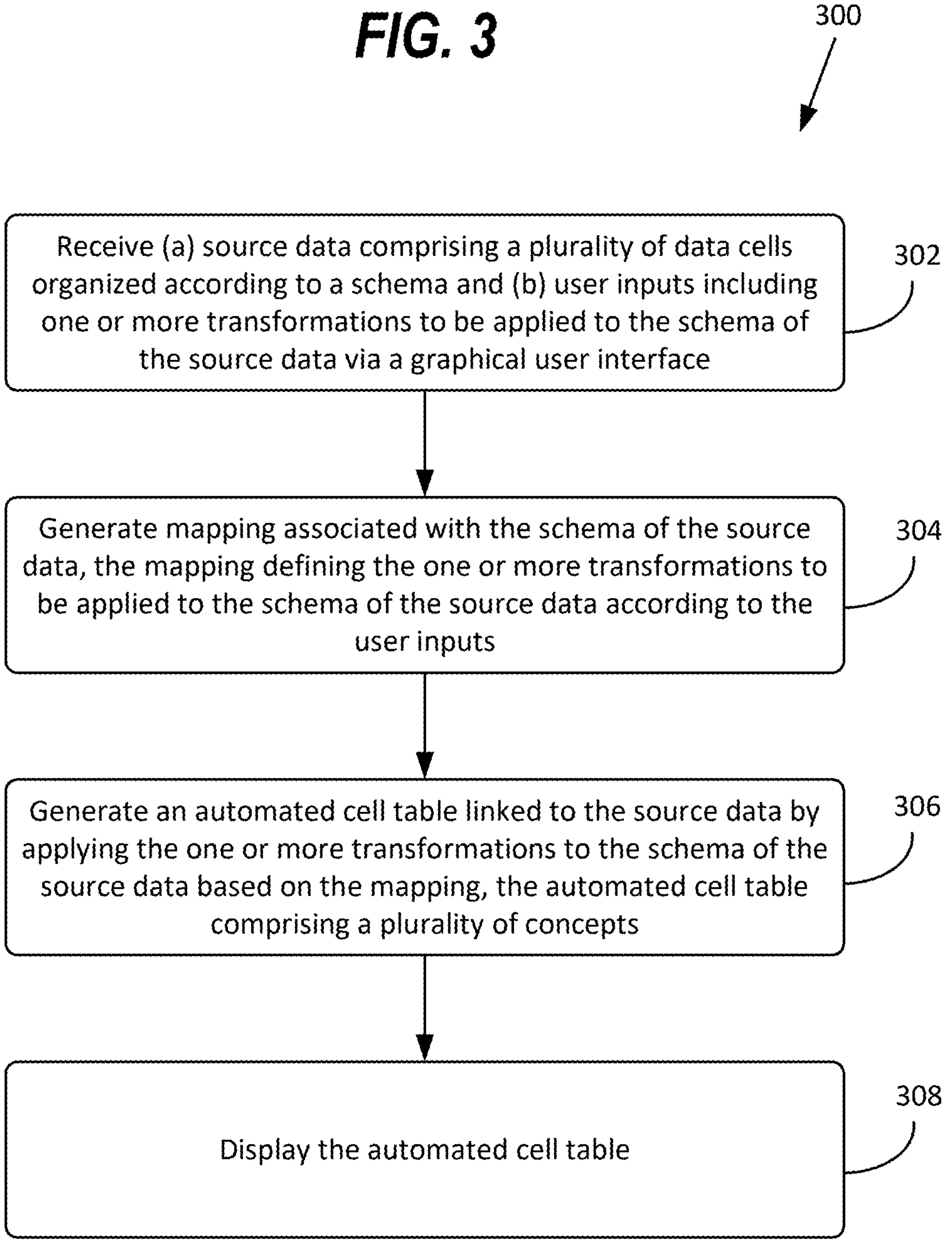
FIG. 3 is a flowchart illustrating an example method, implemented on a server or a computing device, for generating an automated cell table, according to an embodiment

FIG. 3 is a flowchart illustrating an example method 300, implanted on a server or a user device such as an electronic device with data processing capabilities, for generating automated cell tables, according to an embodiment. In some examples, the method 300 is implemented by the productivity server 100 of FIG. 1, which interacts with the database server 106 and the client devices 104. In other embodiments, however, the method 300 is implemented by another suitable computing device. In some examples, steps of the process 300 may be omitted or additional steps may be added. For simplicity, the device that is configured to perform the steps associated with the method 300 is referred to herein as a computing device.

At block 302, the computing device receives source data that includes a plurality of data cells organized according to a schema, which is a structural definition of the source data that defines how data cells are organized within the source data (e.g., in a table). For example, the schema may organize the plurality of data cells by the fields (or concepts) that the data cells belong to. The schema may define structural or hierarchical relationship between different concepts or fields. For example, a data cell may be associated with a certain concept that defines a field (first field) in a schema such that, structurally, the data cell is a part or subset of the first field, and the first field may be a part of subset of another concept that defines another field (second field), such that the other field (second field) has hierarchy over the first field. A plurality of cells (or fields) sharing the same hierarchy would be grouped together and assigned the corresponding grouping information, and the grouping information is associated with a position or level in a hierarchy with respect to other groups, such that groups of lower hierarchy are subsets of a group of upper hierarchy.

A concept or a field in a schema of a dataset may correspond to a plurality of cells associated with an automated cell table (e.g., cells with text content to label the row, table headers, values, subtotals, and/or the like, that are associated with the automated cell table), and the user may select one or more semantics, or nuances, of a concept individually. For example, the user may select the concept of "asset class labels" or "asset class subtotal values" which are labels and values, respectively, associated with the same level of hierarchy or grouping (e.g., the asset class) within the dataset. Alternatively, if the user selects an "asset class" row label in a preview of the table, the user would be selecting all of the values associated with the data cells that correspond to the dataset field information and the grouping position information (e.g., if the "asset class" was a second level of grouping in a "rows" configuration area of the user interface) associated with the selected "asset class." As such, a concept may define a combination of field information and grouping information.

As an illustrative example, a data cell may include a number associated with how many shares of a certain company is owned by the user, and different data cells may indicate the shares of different companies, as part of an investment portfolio of the user. A company may be a subset of an asset class, where the asset class may define the different fields of technology in which the user is currently investing (e.g., artificial intelligence, biotechnology, clean technology, cloud computing, consumer electronics, etc.). An asset class may be a subset of an investment class, which may define the type of investment that is associated with the asset (e.g., common stock, short term investments, etc.). Each of the asset class and investment class may be a separate concept or field, where some of the classes may be mutually exclusive or may be defined such that one class is a subset of another, hierarchically higher, class.

Figure 6:
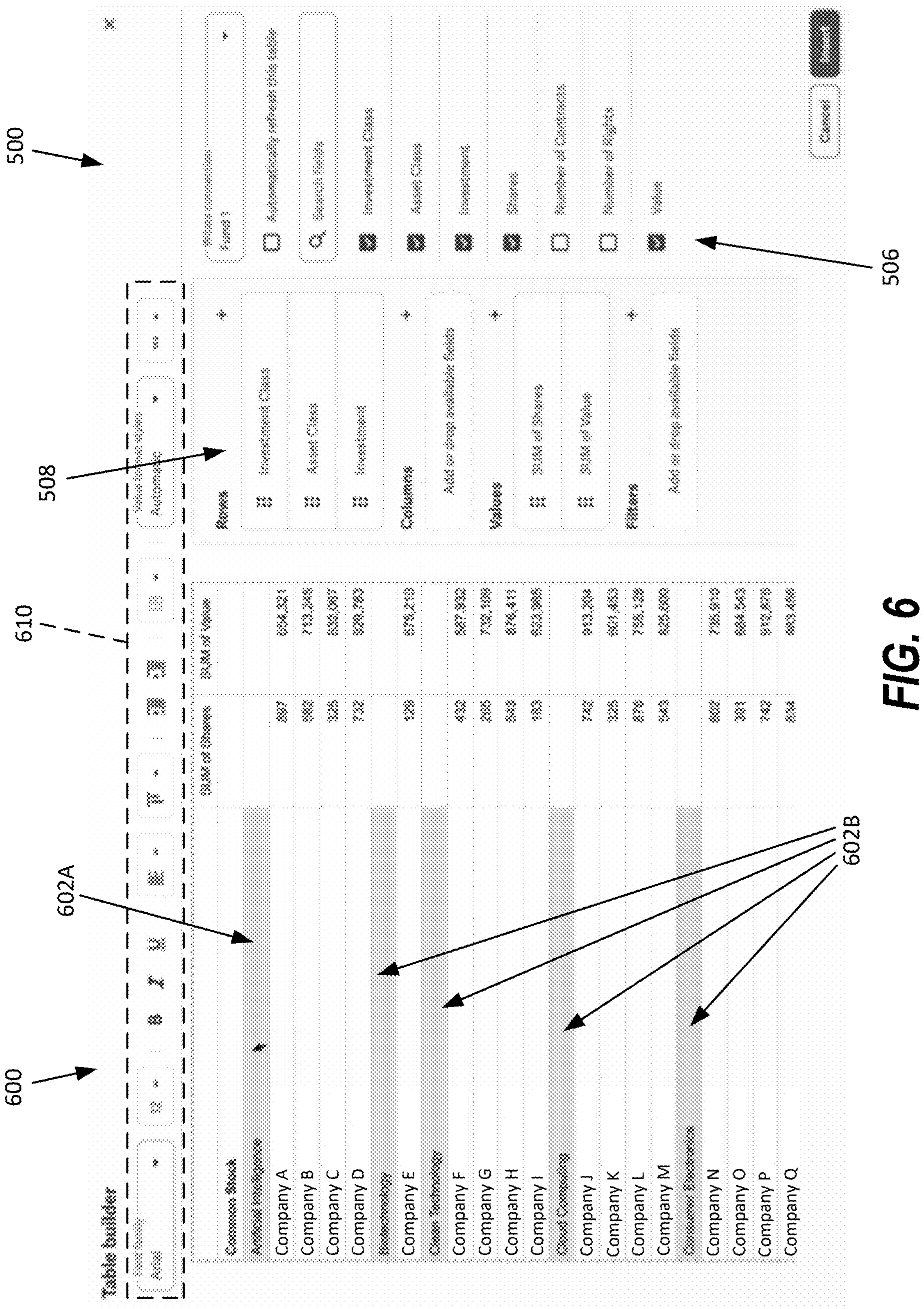

The computing device also receives user inputs that include one or more transformations to be applied to the schema of the source data via a graphical user interface. In some examples, the transformations may include adding one or more new fields into the structural definition of the table, or adding one or more new concepts to the schema. Referring to FIG. 6, as an illustrative example, the user inputs may include selecting one or more concepts via a concept selector 506 to be included in the rows of the table via a relationship organizer 508 (e.g., by dragging and dropping the selected concept or field from the concept selector 506 to the "rows" configuration area of the relationship organizer 508), in order to build a table according to a new structure (schema) as intended by the user.

Figure 15:
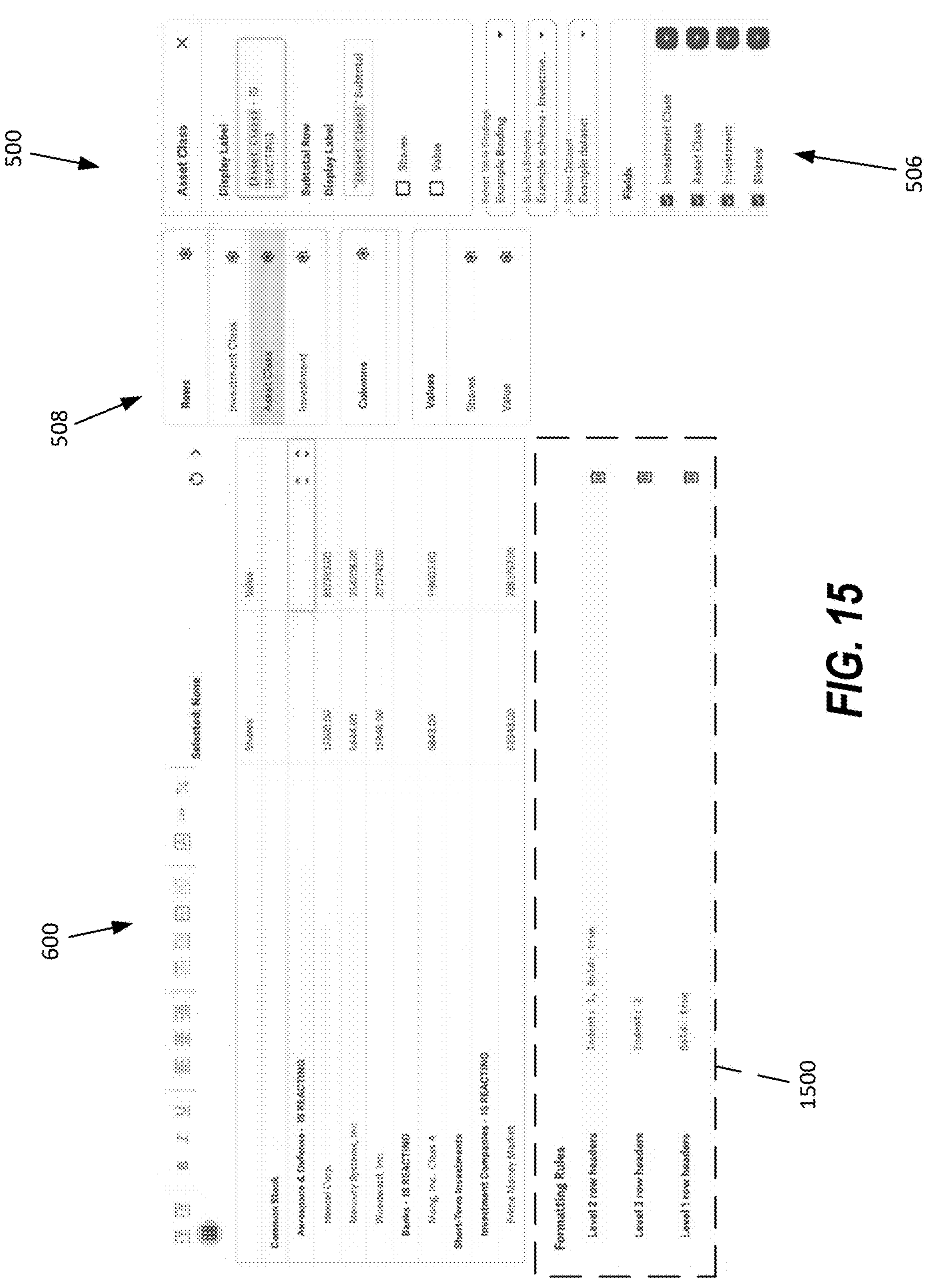
FIG. 15 is a screenshot of example user interface incorporating a formatting rule table, according to an embodiment.

In some examples, the transformations may include changing a layout of the table defined by the schema, by changing one or more formatting rules associated with the layout of the table. Referring to FIG. 15, as another illustrative example, the user inputs may include changing the formatting rules for one or more levels (e.g., hierarchical levels) using the formatting rule table 1500 to apply new formatting rule(s) to a plurality of concepts that correspond to the level(s) based on the grouping position information of the concepts. For example, if all concepts (fields) having "level 2" are to be indented once and bolded, the plurality of cell rows that are associated with the "asset class" concept would be indented once and bolded, according to the formatting rules assigned to that level of concept.

At block 304, the computing device generates a mapping associated with the schema of the source data, where the mapping defines one or more transformations to be applied to the schema of the source data based on the user inputs. For example, the user may define mappings from the schemas (e.g., based on the names and structures described by the schema) to an output of the automated cell table, where the mappings may include transformations, roll-ups, calculations, formatting logic, and conditional rules. According to some examples, the mappings, also referred to as table configurations, may be configured by the user in the graphical user interface to define a wide range of layout options, conditions, roll-ups, calculations, formatting, and/or the like, based on references to the schema of the source data.

At block 306, the computing device generates an automated cell table linked to the source data by applying the one or more transformations to the schema of the source data based on the mapping. The automated cell table includes a plurality of concepts. For example, the automated cell table may include in one column the plurality of assets and in another column showing the corresponding number of shares and/or the corresponding monetary value of the assets. The automated cell table may be generated in a separate document, such as a spreadsheet, from the document that contains the source data while maintaining the linkage between the two documents.

At block 308, the computing device displays the automated cell table as defined by a schema that includes the plurality of concepts, such as on a screen or a display of the computing device, for the user's review. The automated cell table may be displayed in a window next to another window that includes the user interface that allows the user to make changes to the automated cell table.

Figure 4A:
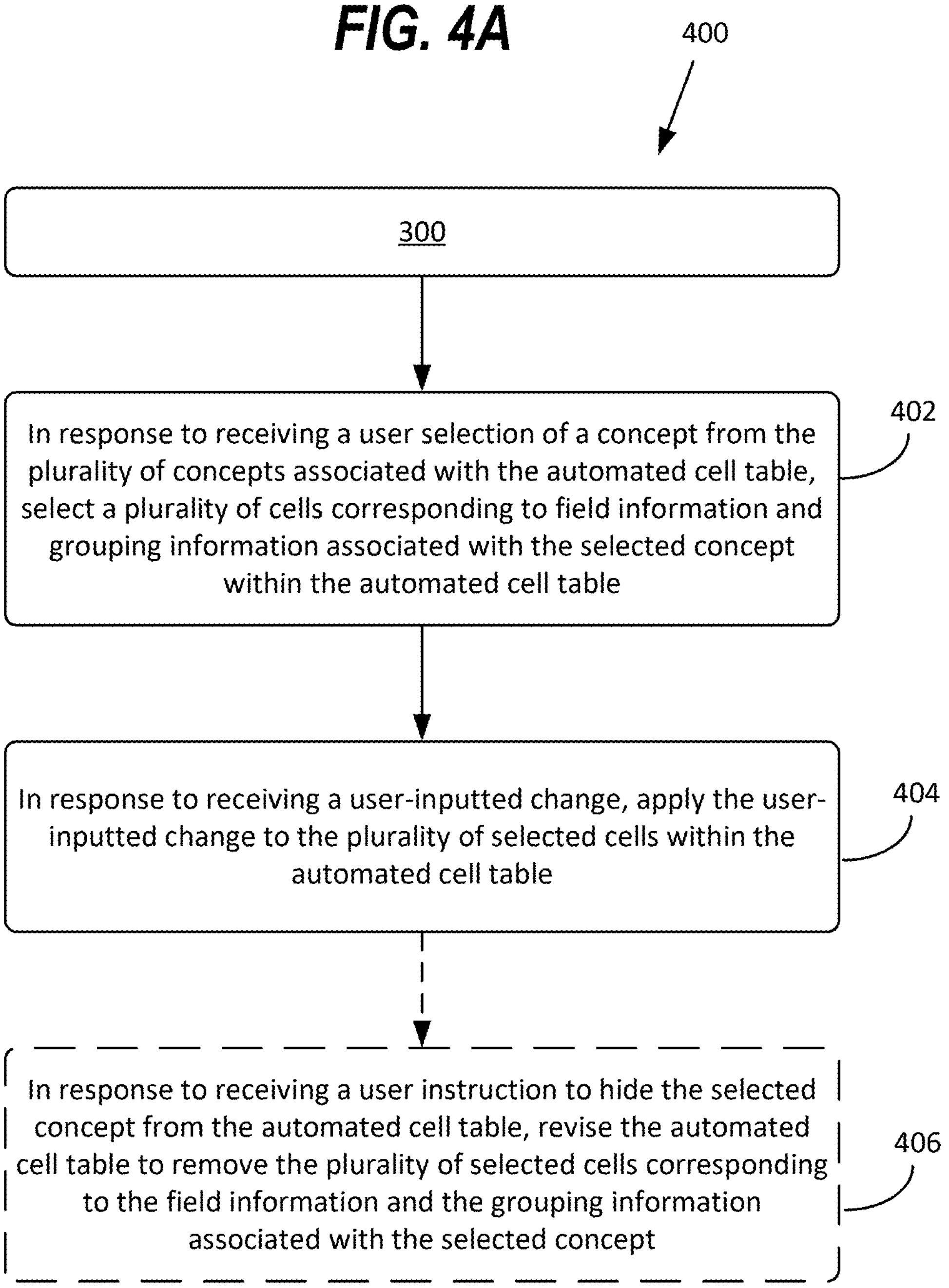
FIGS. 4A and 4B are flowcharts illustrating example methods, implemented on a server or a computing device, for customizing the automated cell table, according to an embodiment.

FIG. 4A is a flowchart illustrating an example method 400, implanted on a server or a user device such as an electronic device with data processing capabilities, for modifying or customizing the automated cell tables, according to an embodiment. The method 400 includes the method 300 as the starting block, such that the user is able to access the automated cell table on the graphical user interface and is also able to make changes to the automated cell table according to the processes disclosed herein.

At block 402, in response to receiving a user selection of a concept from the plurality of concepts on the automated cell table, the computing device selects a plurality of data cells corresponding to a combination of dataset field information and grouping information associated with the selected concept within the automated cell table. The concepts include any class (group) or field within the automated cell table that may be assigned by the user in generating the automated cell table. For example, when a user selects a concept, the concept may be associated with dataset field information (e.g., a field in the dataset that is selected by the user) and grouping information (e.g., a group that the field selected by the user belongs to, as well as the position of the group with respect to other groups of the dataset). In some examples, the selected concept may also be associated with layout information defined by one or more formatting rules pertaining to the selected concept.

For example, the investment class, the asset class, and the investment (e.g., companies) are all different concepts belonging to different groups, such that the investment is a subset of an asset class, and an asset class in turn is a subset of an investment class. If one of the investment classes is selected, a plurality of other investment classes are selected (that is, a plurality of cells corresponding to the dataset field information associated with the user-selected concept are also selected), but the asset classes and the investments are not selected. If one of the assets classes is selected, a plurality of other asset classes are selected, but the investments are not selected. If one of the companies is selected, a plurality of other companies are selected. Therefore, in this block, selecting one of the concepts causes a plurality of other concepts of a similar hierarchical order (or grouping position) to also be selected. In the aforementioned example, when the user selects the concept of an "asset class", the concept is associated with the dataset field information (i.e., the "asset class" field) and the grouping information with respect to other concepts (i.e., the "asset class" field being a subset of the "investment class" field which is of a higher level of grouping in the hierarchy, and also the "asset class" field containing therein the "company" field which is of a lower level of grouping in the hierarchy). In some examples, the selection of the plurality of cells may be performed simultaneously and/or automatically.

At block 404, in response to receiving a user-inputted change, the computing device applies the user-inputted change to the plurality of selected cells within the automated cell table. In some examples, the changes may be performed simultaneously and/or automatically. For example, the user-inputted change may include, but is not limited to, a change in a format of the cells associated with the selected concept (e.g., filling colors or cell borders), a change in a font used in the cells associated with the selected concept (e.g., font size, font color, or font style), or a change in an indentation in the cells associated with the selected concept (e.g., spacings or bullet points). In some examples, the user-inputted change includes one or more changes associated with the plurality of selected cells in at least one of: mapping, formatting rule, aggregation functions, subtotal options, label expressions, header text, or row/column break settings thereof.

Figure 4B:
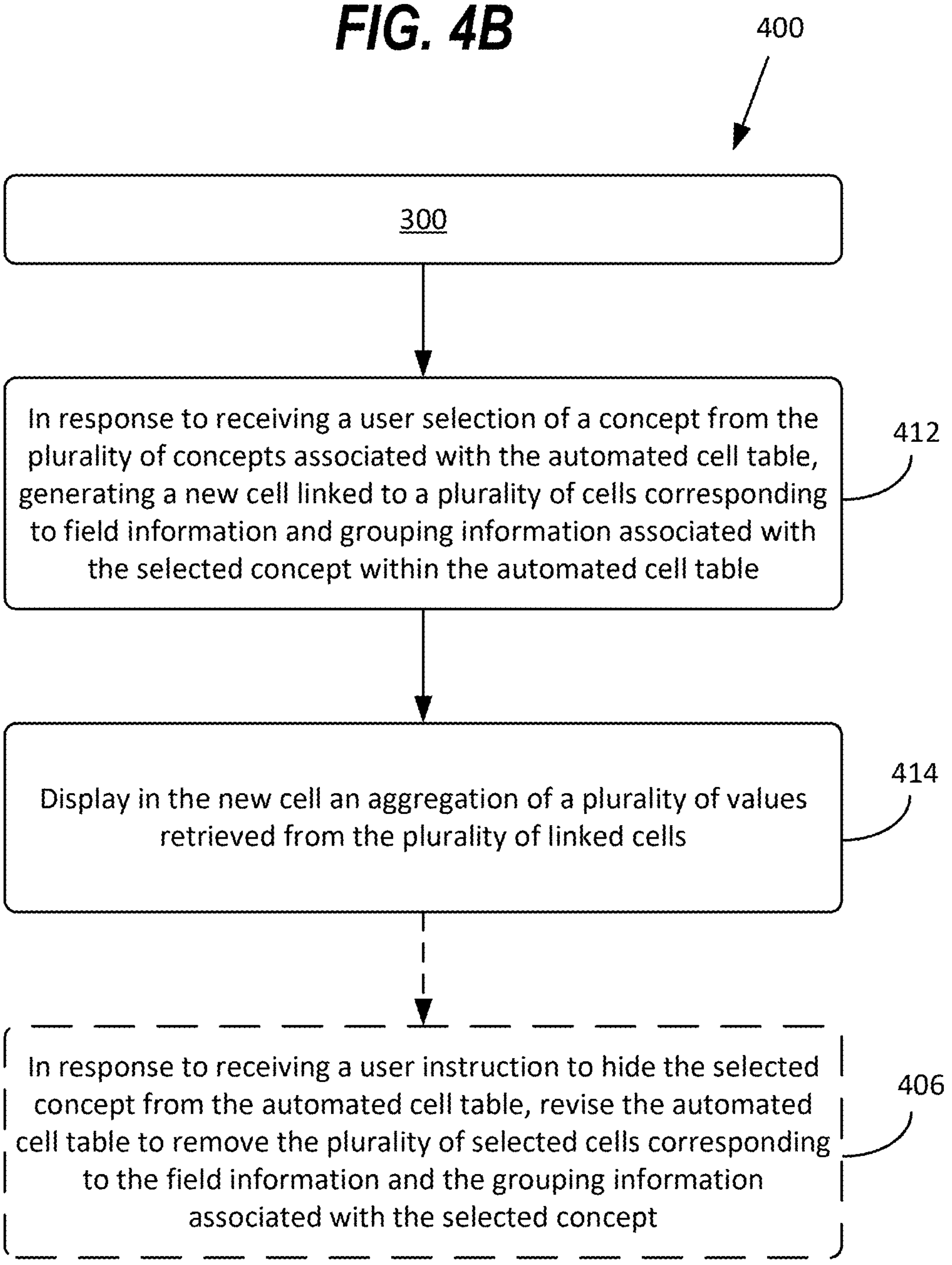

FIG. 4B is a flowchart illustrating another example, or an alternative example, of the method 400 for modifying or customizing the automated cell tables, according to an embodiment. Subsequent to method 300, at block 412, in response to receiving a user selection of a concept from the plurality of concepts associated with the automated cell table, the computing device generates a new cell linked to a plurality of cells corresponding to field information and grouping information associated with the selected concept within the automated cell table. For example, the new cell may be operatively linked to the cells in the source data that correspond to the field information and the grouping information associated with the concept selected by the user such that data can be retrieved from the other cells to the new cell.

At block 414, the computing device displays in the new cell an aggregation of the numbers retrieved from the linked cells. In some examples, the aggregation may be a sum of numbers. Therefore, the sum that is calculated is the sum of the numbers or values associated with the asset class. For example, if an asset class of "artificial intelligence" is selected, the new cell would include the sum of the shares or values of the companies (investments) that are sorted under "artificial intelligence", which means that none of the shares or values of companies sorted under other asset classes (such as "biotechnology" or "clean technology" for example) will be included in the sum calculation associated with the selected asset class of "artificial intelligence." If the asset class has multiple possible numerical sums (e.g., sum of shares and sum of monetary values), the user may be able to select which sum to calculate and display on the automated cell table. In some examples, the aggregation may include a total count of the linked cells. In some examples, the aggregation may include an average value of the numbers associated with the linked cells, or any other suitable mathematical expressions as performed using the numbers associated with the linked cells.

In some examples, the aggregation may include a concatenated expression of a plurality of values retrieved from a plurality of cells, where the values are combined or concatenated together into a single cell. In some examples, the plurality of cells corresponding to a plurality of fields, such that the aggregation may refer to other fields, such as referencing other fields to combine the values from other fields and put them together into the same cell (or cells, such as a column of cells) and arranging the values, such as in accordance with the user's preference. For example, if the new cell is linked to cell #1, cell #2, and cell #3, with each cell having its corresponding value (e.g., "A" in cell #1, "B" in cell #2, and "C" in cell #3), the new cell may include a concatenated expression of "A/B/C" where the first portion is taken from cell #1, the second portion is taken from cell #2, and the third portion is taken from cell #3. In some examples, the formatting of the concatenated expression may be defined by the user, such as using the format of "X,X,X" or "X-X-X" or "X X X", or any combination thereof, for example "X/X,X" instead of "X/X/X" as mentioned above, where each "X" is replaced with a value retrieved from the linked cell(s). As such, the concatenated expression may include the plurality of values being arranged according to one or more rules, such as an order (e.g., which cell's value appears first, second, third, etc.), a layout/format (e.g., whether the values are separated using one or more of: comma, hyphen, space, dash line, etc.), and/or the like. In some examples, the layout/format rules may include any other formatting rules pertaining to one or more visual characteristics such as bolding, indenting, and the like. In some examples, one or more of the rules may be defined by the user, such as via the graphical user interface. The same rule(s) may be applied to a group of new cells, such as a column or row of new cells, that correspond to the field information and the grouping information associated with the selected concept within the automated cell table.

In some examples, for example the method 400 in both FIGS. 4A and 4B, the user may also provide a user instruction to hide certain concepts from being displayed, for presentation or organization purposes. In such cases, at block 406, in response to receiving a user instruction to hide the selected concept from the automated cell table, the computing device revises or updates the automated cell table to remove all the cells associated with the selected concept from being displayed on the automated cell table.

Figure 5:
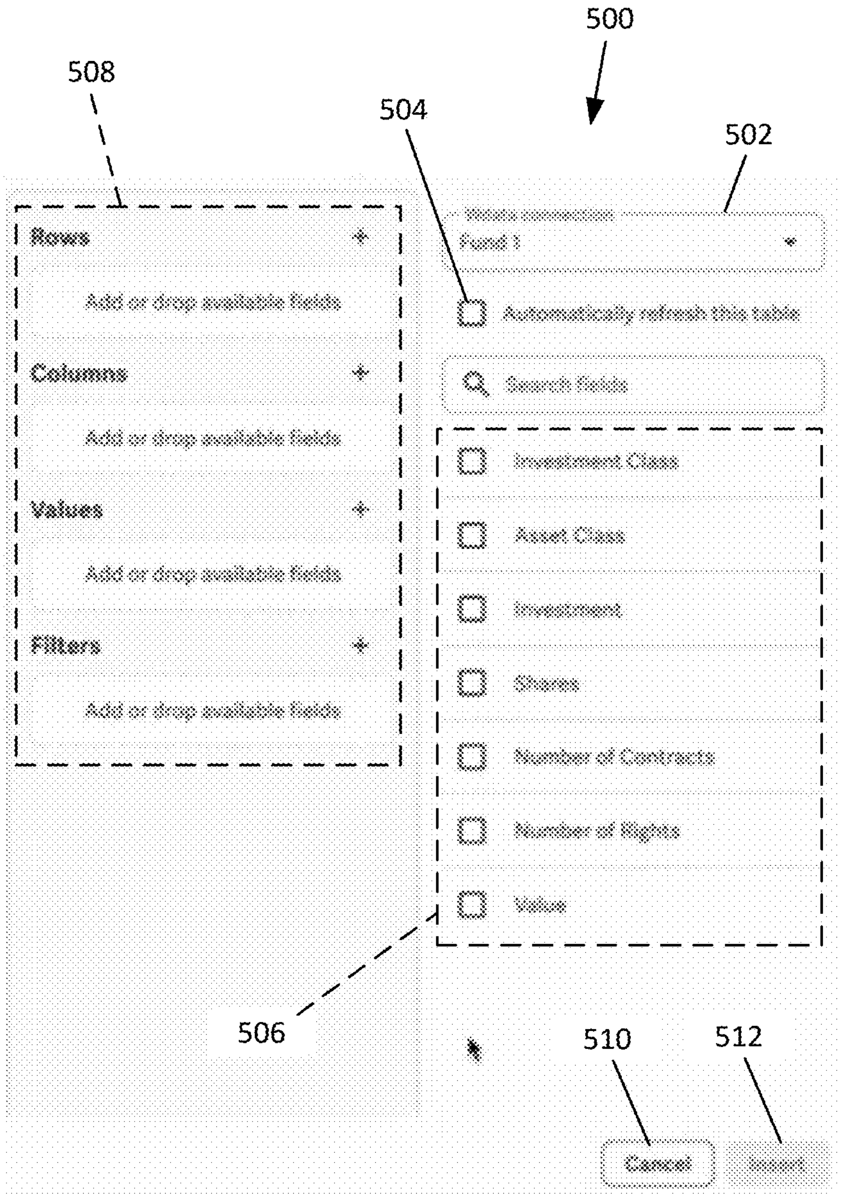
FIGS. 5 through 12 are screenshots of example user interfaces for customizing the automated cell table in different scenarios, according to an embodiment.

FIG. 5 is a screenshot of a graphical user interface 500 (also referred to as an automated cell table builder) for generating the automated cell table, according to embodiments disclosed herein. For example, the graphical user interface 500 may include a source data entry 502 that allows the user to enter the location of the source data in order to form a link with the source data document and retrieve the source data. In some embodiments, the source data entry 502 is optional (i.e., not shown in the graphical user interface 500). The automated cell table may be constantly linked or connected to the source data (e.g., a separate document or spreadsheet from which the automated cell table retrieves information). In some examples, the link is unidirectional (i.e., only from the source data to the automated cell table) such that the graphical user interface 500 or the automated cell table builder does not have the capability to directly changing or rewriting the source data, such that there is little to no risk of the user accidentally deleting or overwriting data in the source data document or spreadsheet.

The graphical user interface 500 may also include an automatic refresh toggle 504 which toggles between causing the automated cell table to automatically refresh or update on a regular basis (e.g., every second, every minute, or any other interval of time as suitable) and pausing such refresh until the user allows the automatic refresh to resume again. In some embodiments, the automatic refresh toggle 504 is optional (i.e., not shown in the graphical user interface 500). The graphical user interface 500 includes a concept selector 506 and a relationship organizer 508 which allow the user to choose and select the concepts (such as class and numerical values) and identify the relationship associated with the concepts (such as structural or hierarchical relationships between the selected concepts). The list of concepts in the concept selector 506 may be automatically populated by the computing device based on analyzing the schema of the source data to retrieve a plurality of concepts that are associated with the schema of the source data, and the concepts can be arranged and rearranged on the relationship organizer 508 as the user prefers. The concepts may then be used or referenced by the mapping or table configuration to map the data of the dataset associated with the concept to either an output, calculation(s), formatting rule(s), and/or the like.

Once the user inputs are entered and the automated cell table is formatted accordingly, the user may cancel the inputs via a cancel input 510 to undo the inputs and start over, or the user may accept the inputs via an insert input 512 that causes the generated automated cell table to be inserted into another document, such as a new document or spreadsheet. It is to be understood that, even after the automated cell table is inserted into another document, the automated cell table maintains the "live" connections or links with the source data, such that any changes reflected in the source data is automatically reflected in the automated cell table that is inserted into the document, without requiring additional manual intervention from the user.

FIG. 6 is a screenshot of the graphical user interface 500 (automated cell table builder) shown side-by-side with an automated cell table 600 that is generated or built based on the user inputs entered via the graphical user interface 500 according to embodiments disclosed herein. In the screenshot, as an example, the automated cell table 600 is a schedule of investments (SOI) table for fund reporting use cases. One of the cells is selected using a cursor (see selected cell 602A) which causes a plurality of additional cells 602B to also be selected according to the concepts that they represent. For example, the selected cell 602A is an asset class of "artificial intelligence." As such, the computing device automatically detects which other cells in the automated cell table 600 represent an asset class, in response to which the cells with "biotechnology", "clean technology", "cloud computing", and "consumer electronics" are also selected, all of which also pertain to different asset classes. Therefore, selecting a single asset class causes all the other asset classes to also be selected. In some examples, the selection may be performed automatically and/or simultaneously. The user can then customize the selected cells using an editor toolbar 610 provided near the graphical user interface 500 and the automated cell table 600, for example to change the font type, font size, indentation, and/or cell border style. The automated cell table 600 is also capable of maintaining the fidelity of the annotations embedded therein.

As shown in the relationship organizer 508 in the graphical user interface 500, the rows are populated by the user with the concepts of investment class, asset class, and investment (companies), in the order of hierarchy. Therefore, the automated cell table is generated such that the investment class has the highest hierarchy, the asset class has the middle hierarchy, and the individual investments have the lowest hierarchy. Under the values section, the user also selects the sum of share and the sum of monetary value associated with each investment (company) to be displayed on a separate column, as reflected in the automated cell table 600. In the concept selector 506, there are additional concepts that are identified ("number of contracts" and "number of rights") that are not selected by the user. The concepts that are not selected do not appear in the automated cell table 600.

Figure 7:
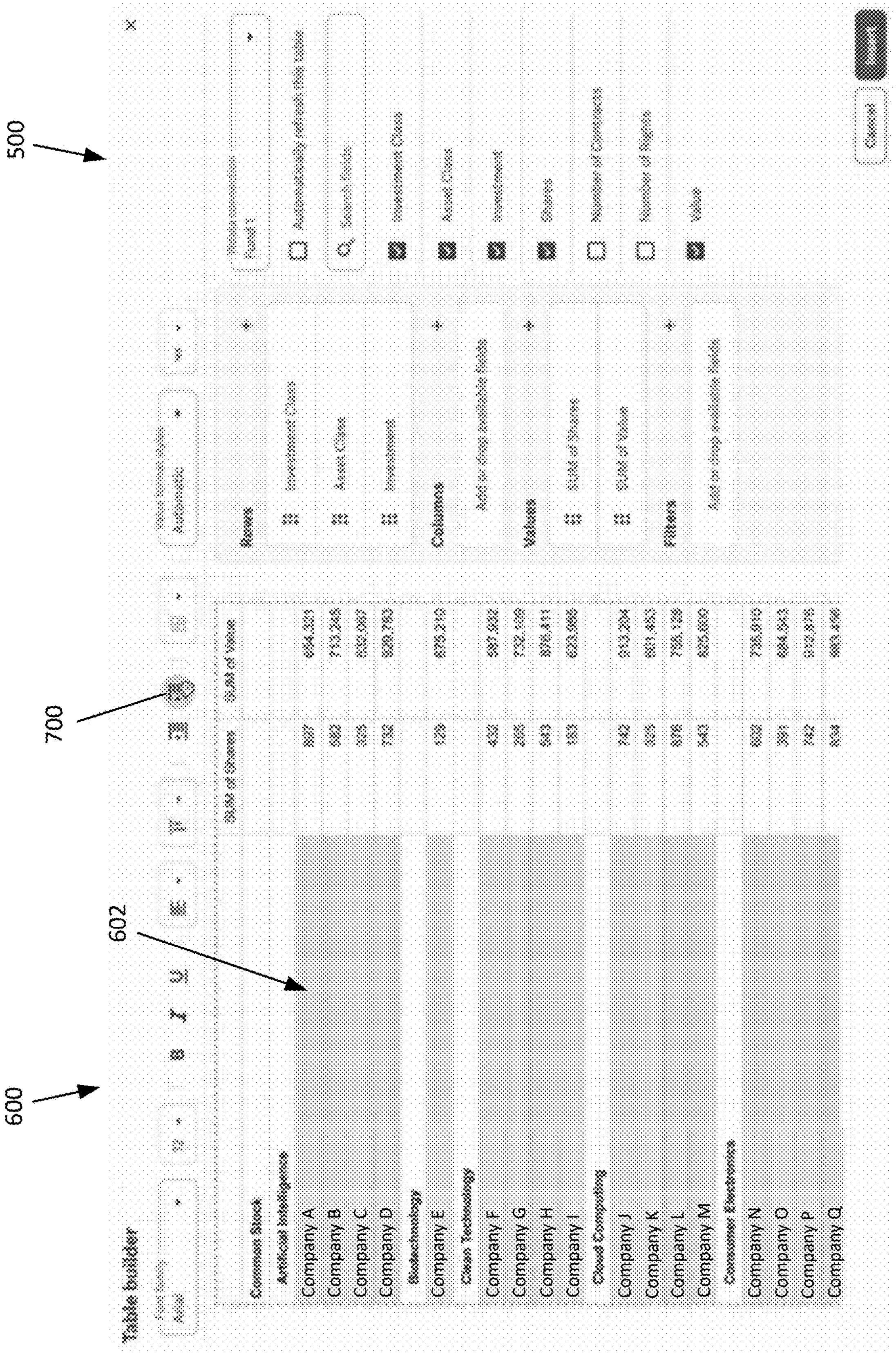

FIG. 7 is a screenshot of the graphical user interface 500 and the automated cell table 600 in which the selected cell 602 is one of the cells belonging to an investment (company), which is of the lowest hierarchy. For example, if the cell for "Company A" is selected, all the cells with the same or similar hierarchy are identified (e.g., "Company B", "Company C", "Company D", etc.) and the identified cells are selected, leaving only the cells associated with the investment class and the asset class to remain unselected. Once the cells are selected, the user can operate an indentation button 700 on the editor toolbar 610 to add more indentations for the investment (company) cells in order to better show visually that these cells are a subset of an asset class, which is in turn a subset of an investment class.

Figure 8:
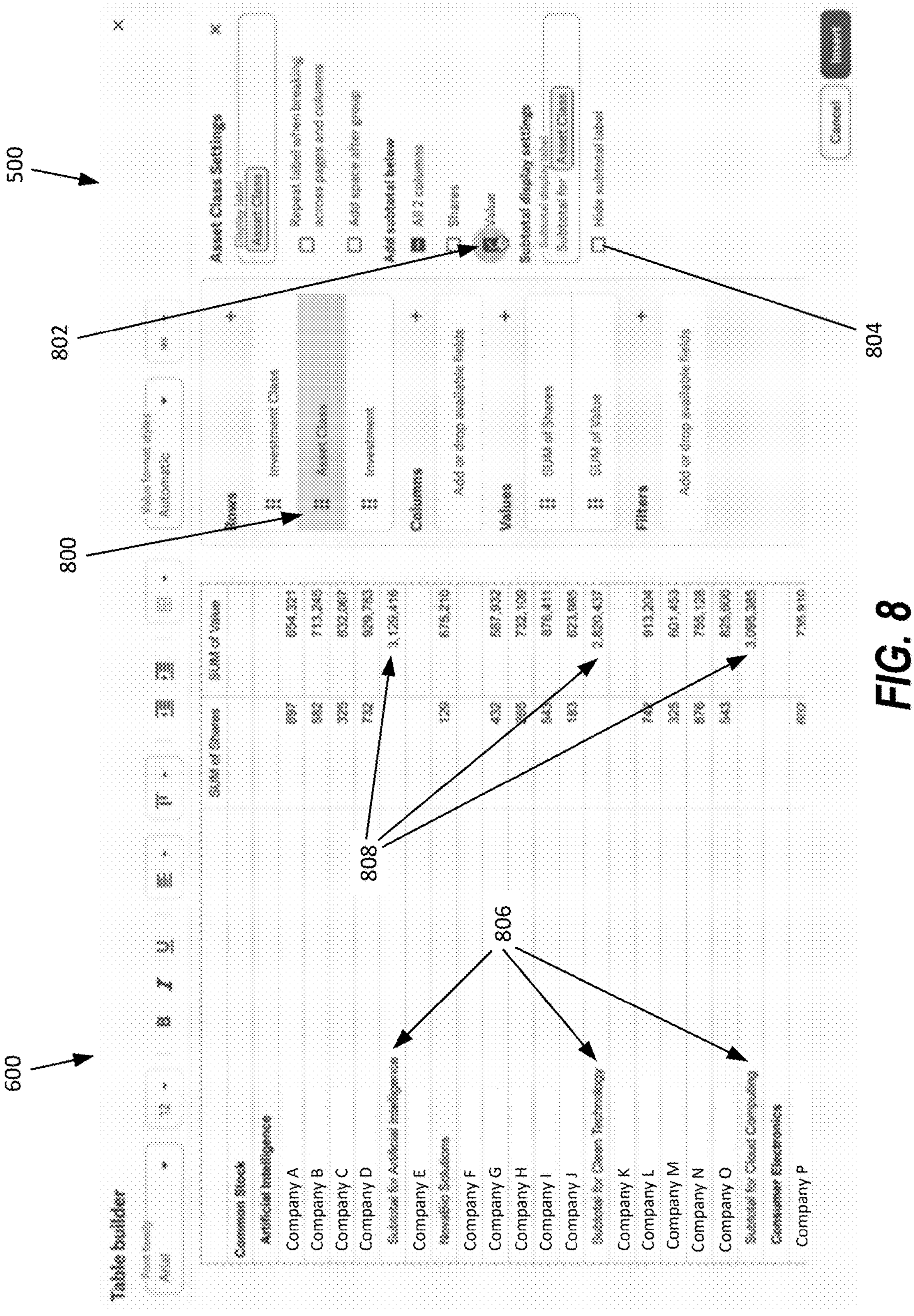

FIG. 8 is a screenshot of the graphical user interface 500 and the automated cell table 600 in which a concept is selected (a selected concept 800) on the graphical user interface 500. The selected concept 800 in this example is the asset class. Display instructions 802 can be provided by the user via the graphical user interface 500 in which a box is provided for each of the numerical sums that can be calculated and displayed on the automated cell table 600 for review. In the example as shown, only the "value" (or monetary value of the investments) is selected, while the "shares" are not; therefore, the sum of values associated with all investments (companies) within the selected concept 800 (the asset class) is displayed as a subtotal 808 for each of the asset classes, whereas the sum of the shares of all investments (companies) within the selected concept 800 (the asset class) is not displayed. In some examples, label instructions 804 can be provided by the user via the graphical user interface 500 in which a box is provided asking the user whether or not to hide a label 806 for the sum, or subtotal, associated with the asset class. Hiding the label 806, for example, may improve the visual presentation of the automated cell table 600.

Figure 9:
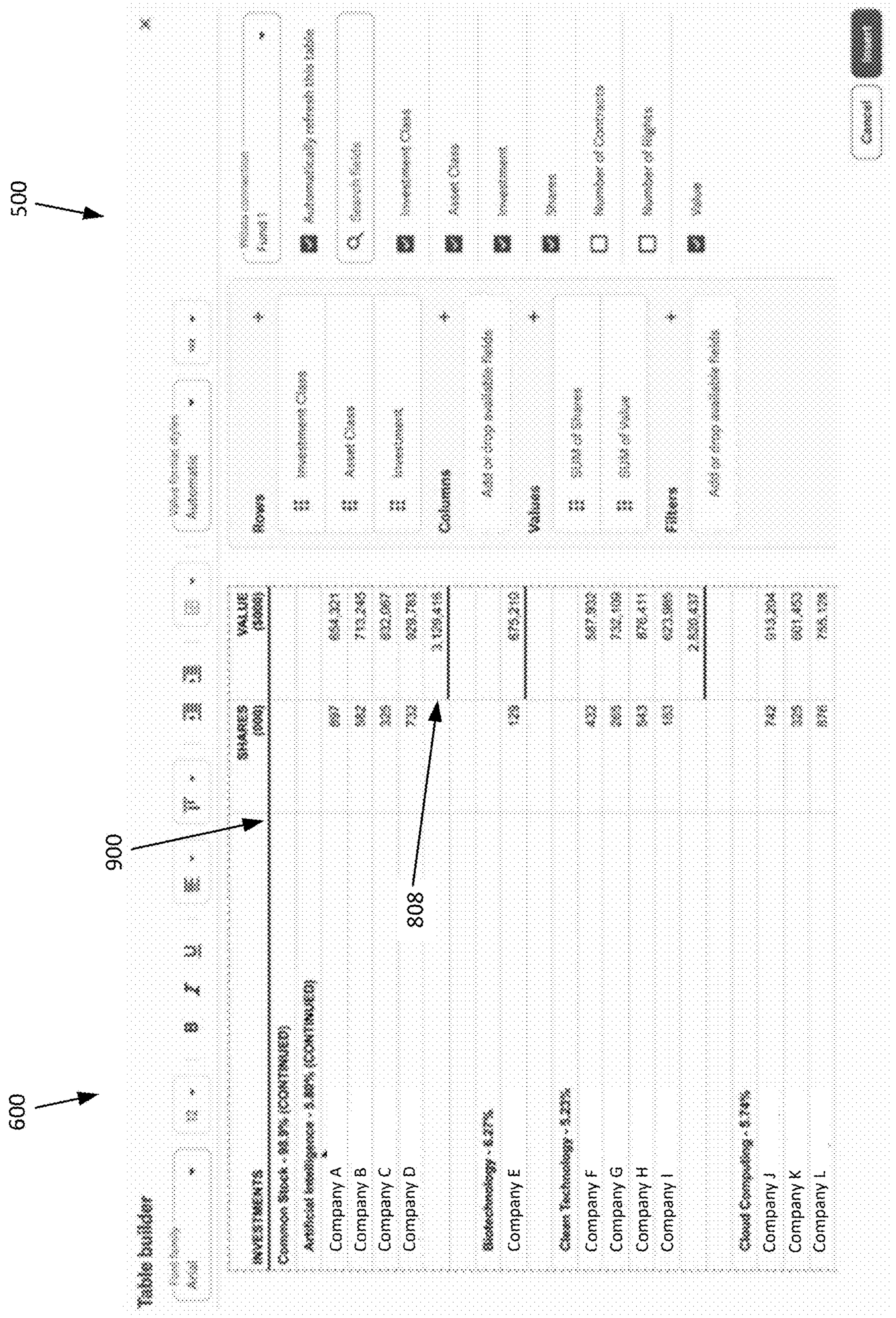

FIG. 9 is a screenshot of the graphical user interface 500 and the automated cell table 600 in which the automated cell table 600 is additionally formatted to include borders 900 or to change a thickness of preexisting borders. Some of the borders 900 may be added underneath certain numbers or labels, as preferred by the user, to improve the visual presentation of the automated cell table 600. For example, adding a bold border underneath each of the subtotals 808 of the asset classes assist in separating the asset classes from each other on the automated cell table 600. Additionally, the example shows the investment classes are labeled with a bold font while remaining non-indented within their respective cells, the asset classes are labeled with a bond font and indented, and the individual investments (companies) are labeled with a regular (non-bold) font and indented.

Figure 10:
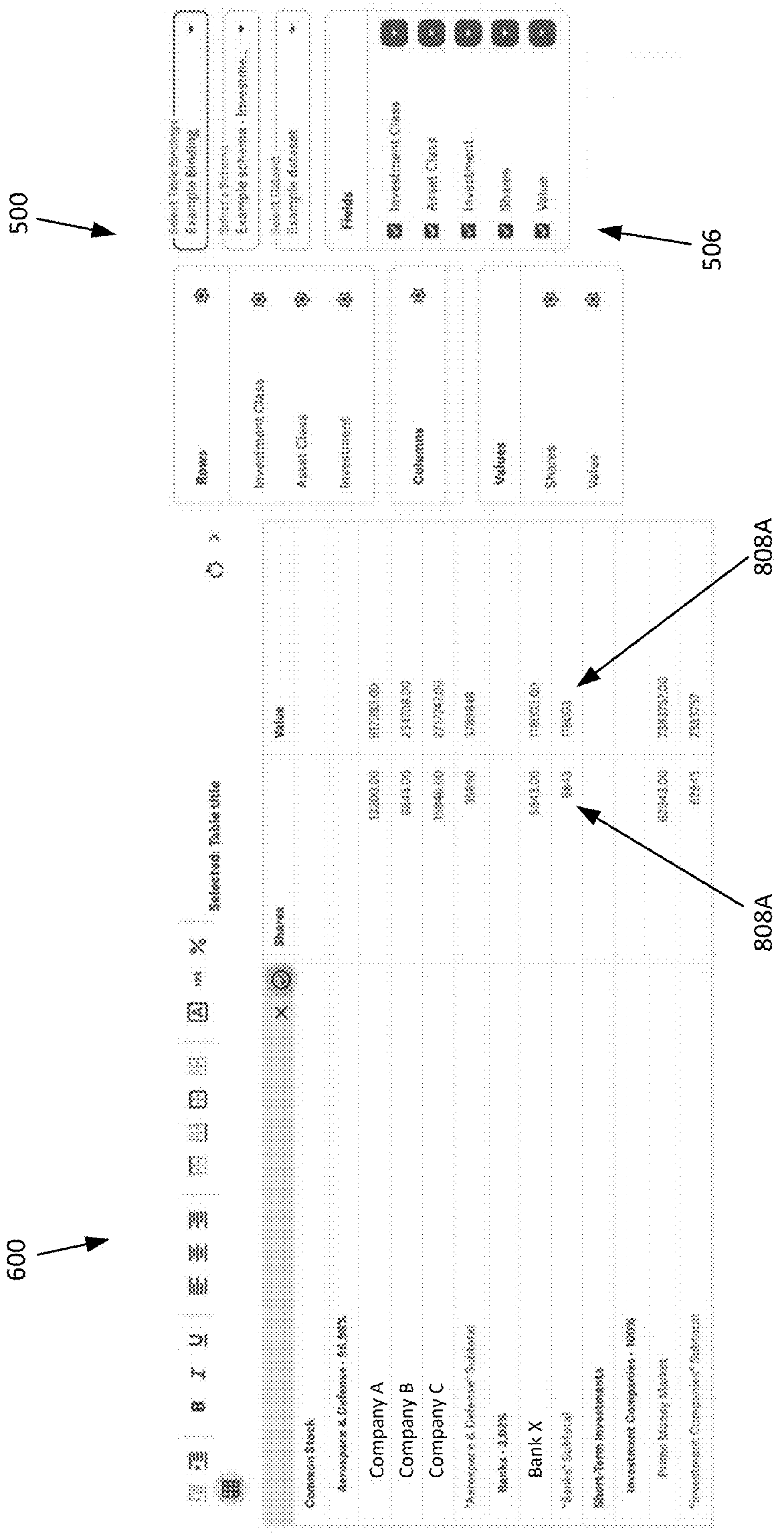

FIG. 10 is a screenshot of the graphical user interface 500 and the automated cell table 600 in which subtotals 808A for the shares are also shown, in addition to subtotals 808B of the value (monetary value) of all the shares within each asset class. In the fields section of the concept selector 506, all the identified fields (or concepts) are selected, indicating that the user prefers to show all the concepts (e.g., investment classes, asset classes, individual investments/companies, shares, and values) in the automated cell table 600.

Figure 11:
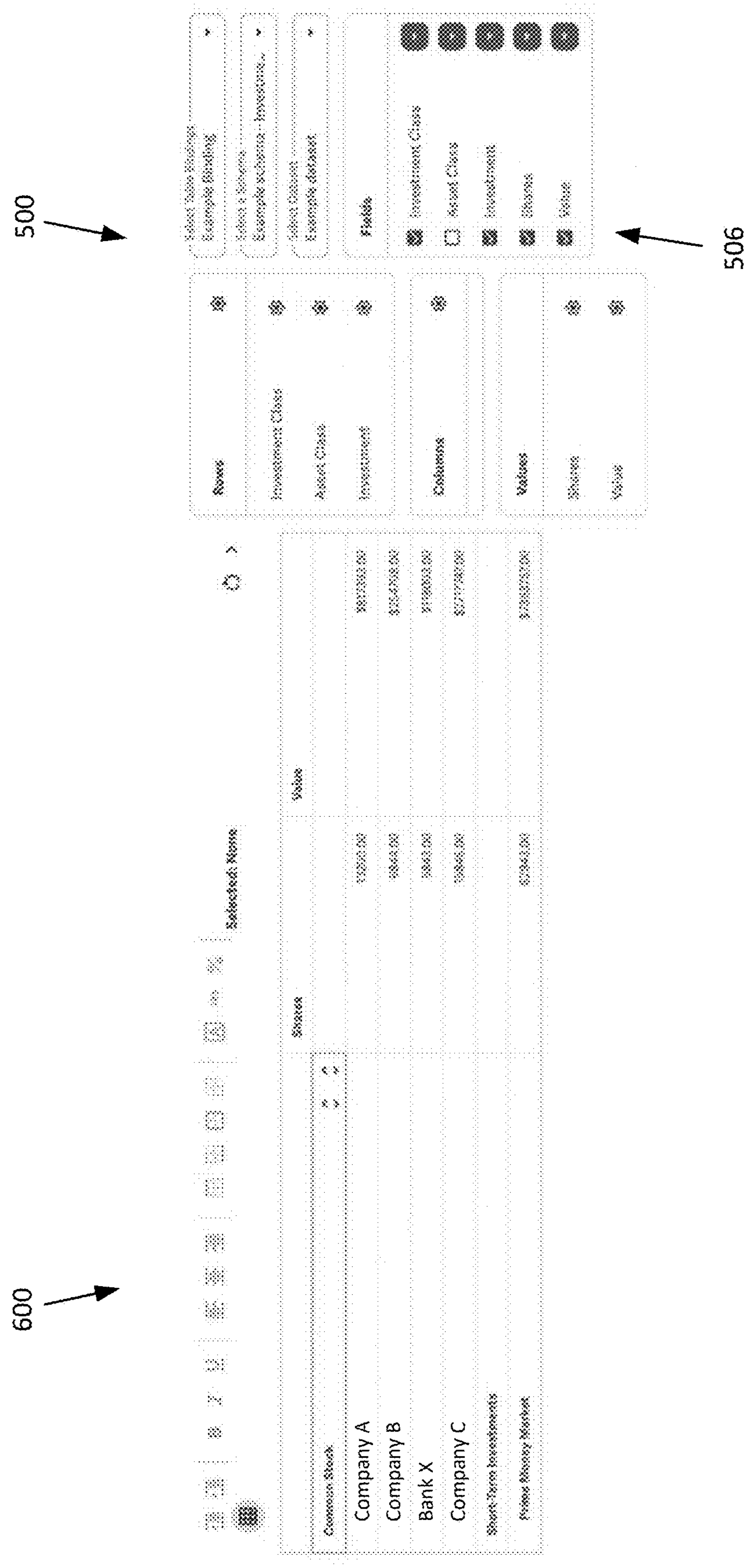

FIG. 11 is a screenshot of the graphical user interface 500 and the automated cell table 600 in which the asset classes are hidden from the automated cell table 600, as instructed by the user in the concept selector 506. In the example as shown, the asset classes under the investment class of "common stock" are "aerospace & defense" and "banks", whereas the asset class under the investment class of "short-term investments" is "investment companies." When only the asset classes are selected to be hidden, only the data cells indicating the labels of the asset classes are hidden from view in the automated cell table 600, but the investments (companies) under the hidden asset classes are still visible. Therefore, the user can flexibly customize which labels to remove in a single action, without having to individually remove the labels manually, which can be prone to human errors that may cause unintended cell deletion or cause cells that should be deleted to remain in the table, possibly causing confusion and calculation errors.

Figure 12:
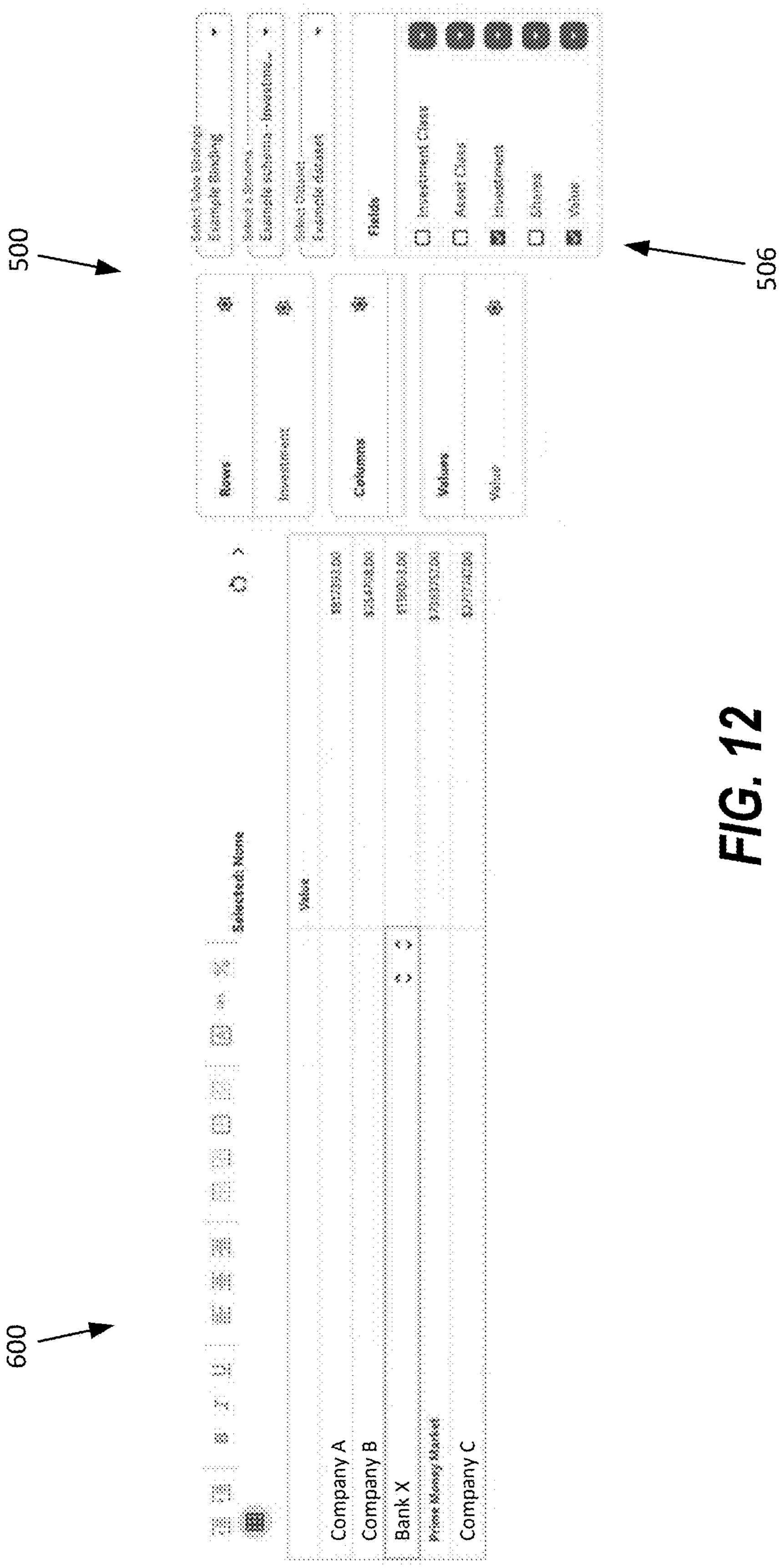

FIG. 12 is a screenshot of the graphical user interface 500 and the automated cell table 600 in which, in addition to the asset classes, the investment classes and the shares numbers are also hidden from the automated cell table 600, as instructed by the user in the concept selector 506. Therefore, the only visible concepts are the individual investments (companies) and the numerical values (monetary values) associated with the shares (e.g., stocks) pertaining to each investment. The user can thus simplify the visual presentation of the automated cell table 600 with fewer actions than manually removing the unwanted labels and columns from the table. In some examples, the automated cell table 600 may be outputted to be written into an existing embedded table, and/or manual formatting may be applied to the individual table cells of the automated cell table 600 after the automatic formatting is performed using the graphical user interface 500.

Figure 13:
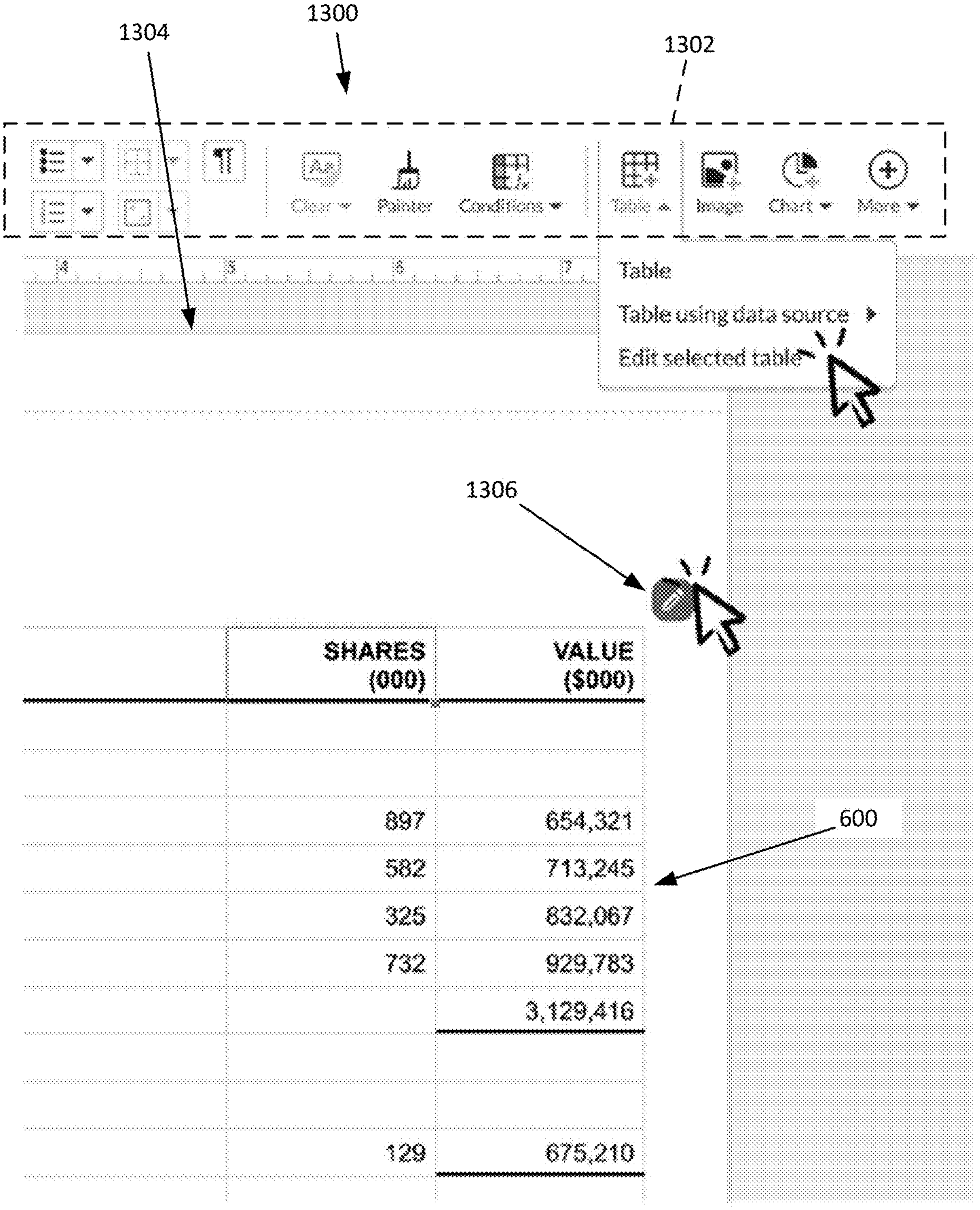
FIGS. 13 and 14 are screenshots of example user interface for editing or refreshing source data connection associated with the automated cell table after the automated cell table is inserted into a document, according to an embodiment.

FIG. 13 is a screenshot of a graphical user interface 1300 associated with the automated cell table 600 that is inserted into a document 1304. The graphical user interface 1300 may include a toolbar 1302 located above the document 1304 and/or a floating button 1306 located on the document 1304 adjacent or near the automated cell table 600. The graphical user interface 1300 provides the user with options for a direct access point or entry point to the graphical user interface 500 that was used to generate and edit the automated cell table 600 and/or to the source data to which the automated cell table 600 is linked. For example, the toolbar 1302 may have a button and/or a pulldown menu associated with the table, and the button and/or pulldown menu includes a direct access point to the graphical user interface 500 or automated cell table builder that allows the user to edit the automated cell table 600 and/or access the source data. The floating button 1306 may provide similar capabilities as the toolbar 1302 but with fewer user actions.

Figure 14:
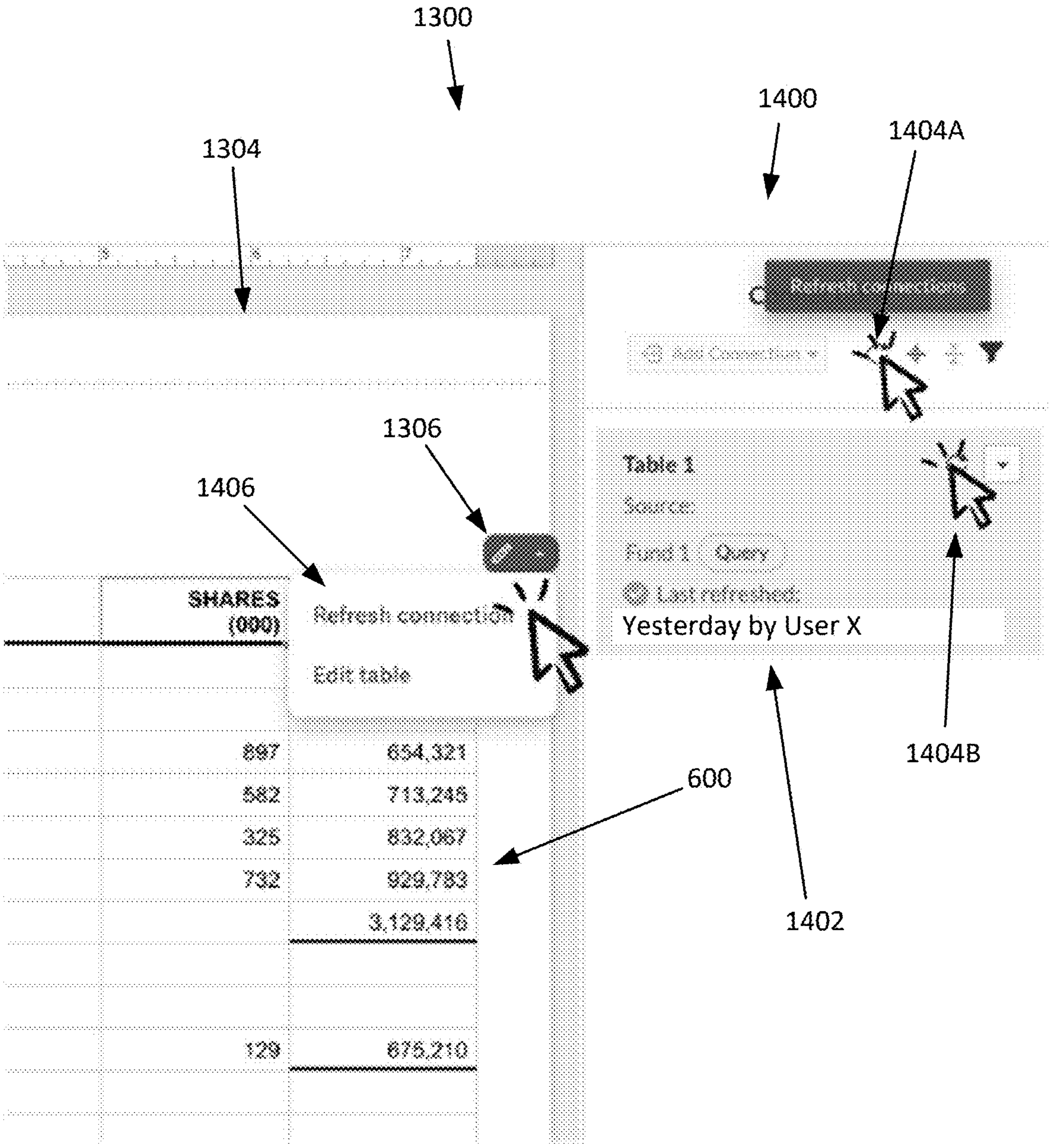

FIG. 14 is a screenshot of the graphical user interface 1300 associated with the automated cell table 600, which is generated using the source data and inserted into the document 1304, when a change in the source data is detected. A connection update window 1400 appears alongside the automated cell table 600 displaying an indication 1402 of a change in the source data. When multiple changes are detected in the source data, there will be multiple indications 1402 displayed in the window 1400 showing the timestamped changes for the user's review as well as the identification of the users who made the timestamped changes. The change shown in the indications 1402 is limited to the source data change that was not reflected in the automated cell table 600 when the automated cell table 600 was generated or last updated, that is, any change that is timestamped after the timestamp associated with the generating of or the last update in the automated cell table 600. In response to the indication 1402, the user may activate a refresh button(s) 1404 located on the window 1400, such as a universal refresh button 1404A that automatically refreshes the automated cell table 600 to include all the changes displayed on the window 1400, or an individual refresh button 1404B that allows the user to individually select which change (if there are multiple changes) to reflect in the automated cell table 600. In some examples, the floating button 1306 may provide a refresh button 1406 to refresh connection with the source data, such as via a pulldown menu.

Alternatively, in some examples, the indication may not be provided, but instead, in response to automatically detecting one or more changes in the source data, the automated cell table may be automatically updated to reflect the one or more changes in the source data. Therefore, no user input is required in order to perform the automatic update.

FIG. 15 is a screenshot of the graphical user interface 500 and the automated cell table 600 in which a formatting rule table 1500 is provided for semantic selections for formatting rules, which allows the user to flexibly and precisely create and tailor the formatting rules associated with the plurality of concepts. For example, in the example as shown, the concepts are grouped into three levels: "Level 1", "Level 2", and "Level 3", where each level of concept is assigned a formatting rule. The formatting rules describe the layout of the table that is being configured. According to the defined layout, in the table as configured by the formatting rules, the level 1 row headers must be bolded but not indented; the level 2 row headers must be indented once and its content bolded; and the level 3 row headers must be indented twice, but not bolded. Therefore, in this example, level 1 (corresponding to the field of "investment class") is the uppermost hierarchy, and level 3 (corresponding to the field of "investment") is the lowest hierarchy. Furthermore, the user may additionally select a smaller concept within the concept or field, such as a "display label" of the concept of an asset class ("asset class label"), the "shares" or "value" of the concept of an asset class ("asset class shares" and "asset class values"), and the like, providing additional granularity with respect to what the user may select to change.

As shown by the exemplary screenshots in FIGS. 6 through 15, the graphical user interface or the automated cell table builder provides the benefit of an intuitive table structuring experience for the user to flexibly and automatically configure the data fields and data structures associated with the generated cell table in view of user inputs, without requiring the user to manually enter or organize individual data cells or requiring the user to have a working knowledge or experience in making pivot tables from a spreadsheet. The table formatting is streamlined via the rules assigned by the user (e.g., based on the assigned relationship between the concepts provided in the table, cell style determined by the user, displaying or hiding certain labels and subtotals, or any other formatting instructions as provided by the user). The user is also provided with the sematic selections capability that combine schema and layout information to create flexible and precise formatting rules to be applied with an additional level of granularity and refinement. Because the automated cell table is linked to the source data, the presentation of the table stays up-to-date as the source data changes; as such, when another user is making edits to the source data, the edits may be reflected in or near real-time to the automated cell table while the user is entering inputs to customize the layout of the automated cell table, for example. Furthermore, the automated cell table offers the user an interface to provide semantic selections of rule definitions and/or table layout and formatting that are automatically reflected throughout the table, thereby shortening time-to-value metrics. The annotated cell table also provides the capabilities to support annotations beyond scripting for a more user-friendly experience in building and editing tables.

The graphical user interface 500 and the automated cell table 600 may be provided by the computing device of FIG. 2, one or more of the computing devices 104, or other suitable devices, in various examples. In some examples, the user interface may correspond to the client software 105 and display a source or destination document (or a portion thereof). The source and destination documents may be any suitable electronic document, for example, a spreadsheet document, text or text-based document (e.g., contract or legal document, source code, essay, HTML, script, etc.), presentation document, or other suitable document types.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, solid state drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the disclosure.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. Finally, the steps of all methods described herein may be performed in any suitable order unless otherwise indicated herein or otherwise clearly contradicted by concept.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words “mechanism”, “element”, “unit”, “structure”, “means”, and “construction” are used broadly and are not limited to mechanical or physical embodiments, but may include software routines in conjunction with processors, etc.

The use of any and all examples, or exemplary language (e.g., “such as”) provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the disclosure unless the element is specifically described as “essential” or “critical.” It will also be recognized that the terms “comprises”, “comprising”, “includes”, “including”, “has”, and “having”, as used herein, are specifically intended to be read as open-ended terms of art. The use of the terms “a” and “an” and “the” and similar referents in the concept of describing the disclosure (especially in the concept of the following claims) are to be construed to cover both the singular and the plural, unless the concept clearly indicates otherwise. In addition, it should be understood that although the terms “first”, “second”, etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of generating a structured data table, the method carried out by one or more computing devices and comprising:

receiving (a) source data comprising a plurality of data cells organized according to a schema defining a structural organization of the plurality of data cells and (b) user inputs including one or more transformations to be applied to change the structural organization defined by the schema of the source data via a graphical user interface;

generating mapping associated with the schema of the source data, the mapping defining the one or more transformations to be applied to the schema of the source data according to the user inputs;

newly generating an automated cell table that is separate from and linked to the source data by applying the one or more transformations to the schema of the source data based on the mapping, the automated cell table comprising a plurality of concepts where each concept is associated with a plurality of cells within the automated cell table; and displaying the automated cell table.

2. The method of claim 1, further comprising:

in response to receiving a user selection of a concept from the plurality of concepts associated with the automated cell table, selecting the plurality of cells corresponding to field information and grouping information associated with the selected concept within the automated cell table.

3. The method of claim 2, further comprising:

in response to receiving a user-inputted change, applying the user-inputted change to the plurality of selected cells within the automated cell table.

4. The method of claim 3, wherein the user-inputted change comprises one or more change associated with the plurality of selected cells in at least one of: the mapping, a formatting rule, aggregation functions, subtotal options, label expressions, header text, or row/column break settings.

5. The method of claim 1, further comprising:

in response to receiving a user selection of a concept from the plurality of concepts associated with the automated cell table, generating a new cell linked to the plurality of cells corresponding to field information and grouping information associated with the selected concept within the automated cell table; and displaying in the new cell an aggregation of a plurality of values retrieved from the plurality of linked cells.

6. The method of claim 5, wherein the aggregation includes one of: a sum of the plurality of values, an average of the plurality of values, a total count of the plurality of values, or a concatenated expression based on the plurality of values.

7. The method of claim 6, wherein the concatenated expression includes the plurality of values that are arranged according to one or more rules defined by a user.

8. The method of claim 7, wherein the one or more rules include an order in which the plurality of values are arranged within the new cell, and/or a layout or format in which the plurality of values are arranged within the new cell.

9. The method of claim 2, further comprising:

in response to receiving a user instruction to hide the selected concept from the automated cell table, revising the automated cell table to remove the plurality of selected cells corresponding to the field information and the grouping information associated with the selected concept.

10. The method of claim 1, further comprising:

in response to detecting one or more changes in the source data, display on the graphical user interface an indication associated with the one or more changes in the source data; and in response to receiving a user instruction to accept the one or more changes in the source data, updating the automated cell table to reflect the one or more changes in the source data.

11. The method of claim 7, further comprising:

in response to automatically detecting one or more changes in the source data, automatically updating the automated cell table to reflect the one or more changes in the source data.

12. A computing device that generates a structured data table, the computing device comprising a processor and a non-transitory computer-readable memory, wherein the processor is configured to carry out instructions from the memory that configure the computing device to:

receive (a) source data comprising a plurality of data cells organized according to a schema defining a structural organization of the plurality of data cells and (b) user inputs including one or more transformations to be applied to change the structural organization defined by the schema of the source data via a graphical user interface;

generate mapping associated with the schema of the source data, the mapping defining the one or more transformations to be applied to the schema of the source data according to the user inputs;

newly generate an automated cell table that is separate from and linked to the source data by applying the one or more transformations to the schema of the source data based on the mapping, the automated cell table comprising a plurality of concepts where each concept is associated with a plurality of cells within the automated cell table; and display the automated cell table.

13. The computing device of claim 12, wherein the processor is configured to carry out instructions from the memory that configure the computing device to:

in response to receiving a user selection of a concept from the plurality of concepts associated with the automated cell table, select the plurality of cells corresponding to field information and grouping information associated with the selected concept within the automated cell table.

14. The computing device of claim 13, wherein the processor is configured to carry out instructions from the memory that configure the computing device to:

in response to receiving a user-inputted change, apply the user-inputted change to the plurality of selected cells within the automated cell table.

15. The computing device of claim 14, wherein the user-inputted change comprises one or more change associated with the plurality of selected cells in at least one of:

the mapping, a formatting rule, aggregation functions, subtotal options, label expressions, header text, or row/column break settings.

16. The computing device of claim 12, wherein the processor is configured to carry out instructions from the memory that configure the computing device to:

in response to receiving a user selection of a concept from the plurality of concepts associated with the automated cell table, generating a new cell linked to the plurality of cells corresponding to field information and grouping information associated with the selected concept within the automated cell table; and displaying in the new cell an aggregation of a plurality of values retrieved from the plurality of linked cells.

17. The computing device of claim 16, wherein the aggregation includes one of: a sum of the plurality of values, an average of the plurality of values, a total count of the plurality of values, or a concatenated expression based on the plurality of values.

18. The computing device of claim 17, wherein the concatenated expression includes the plurality of values that are arranged according to one or more rules defined by a user.

19. The computing device of claim 18, wherein the one or more rules include an order in which the plurality of values are arranged within the new cell, and/or a layout or format in which the plurality of values are arranged within the new cell.

20. The computing device of claim 13, wherein the processor is configured to carry out instructions from the memory that configure the computing device to:

in response to receiving a user instruction to hide the selected concept from the automated cell table, revising the automated cell table to remove the plurality of selected cells corresponding to the field information and the grouping information associated with the selected concept.

21. The computing device of claim 12, wherein the processor is configured to carry out instructions from the memory that configure the computing device to:

in response to detecting one or more changes in the source data, display on the graphical user interface an indication associated with the one or more changes in the source data; and in response to receiving a user instruction to accept the one or more changes in the source data, updating the automated cell table to reflect the one or more changes in the source data.

22. The computing device of claim 18, wherein the processor is configured to carry out instructions from the memory that configure the computing device to:

in response to automatically detecting one or more changes in the source data, automatically updating the automated cell table to reflect the one or more changes in the source data.

* * * * *